July 2, 1957  A. J. BLESENER  2,797,763
CRAWLER TRACTOR ADAPTED FOR WIDE ENDLESS TREADS
Filed Aug. 30, 1954  3 Sheets-Sheet 1

INVENTOR.
A. J. Blesener
BY Arthur H. Sturges.
Attorney

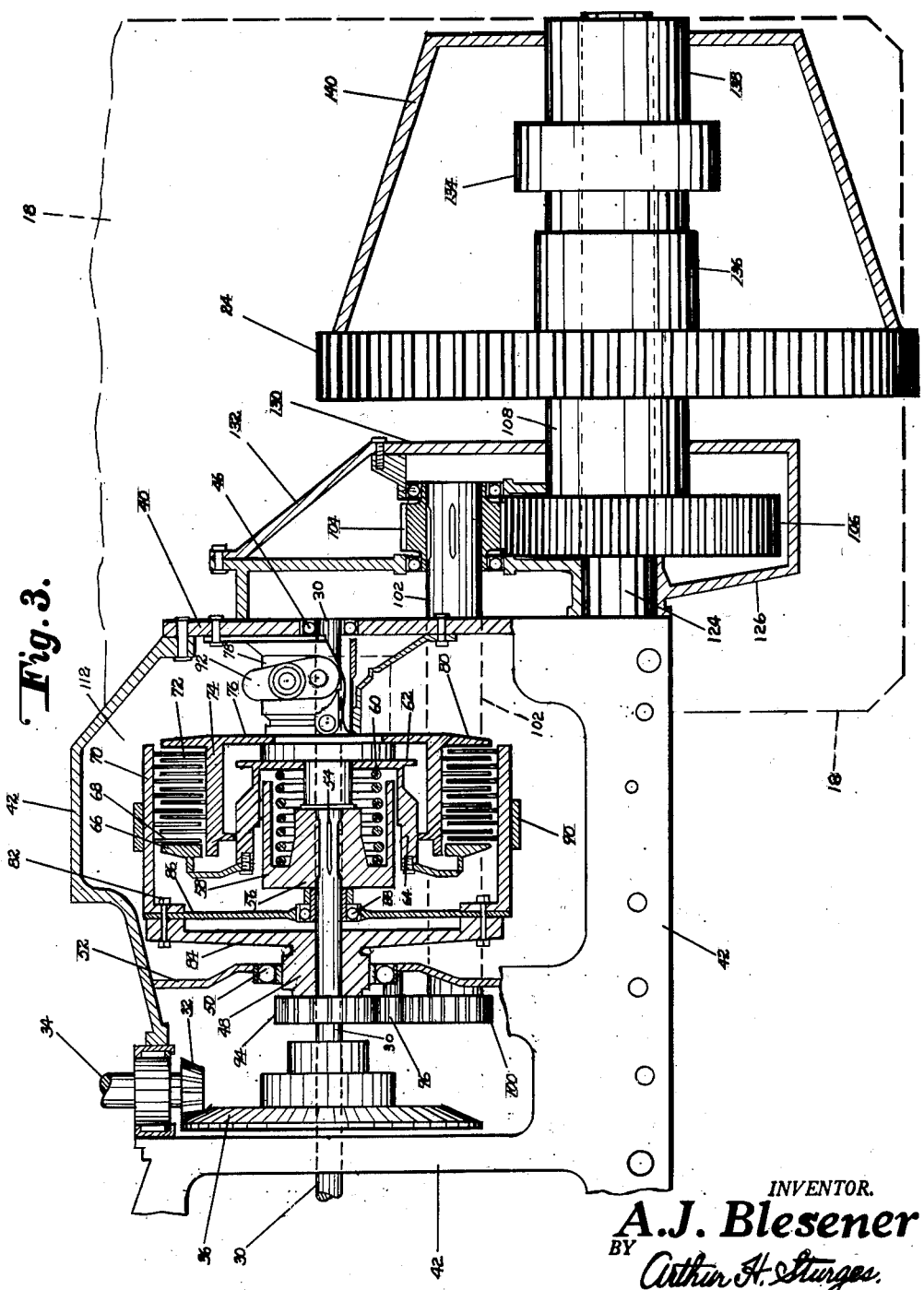

United States Patent Office 2,797,763
Patented July 2, 1957

2,797,763

CRAWLER TRACTOR ADAPTED FOR WIDE ENDLESS TREADS

Anthony J. Blesener, Northfield, Minn.

Application August 30, 1954, Serial No. 452,817

3 Claims. (Cl. 180—6.7)

This invention relates to farm implements and construction machinery, such as tractors of the crawler type, and in particular a tractor power unit wherein the steering clutches drive back around the driving shafts toward the center and through trains of gears to the cog wheels of the crawler tracks, thereby making it possible to increase the widths of the tracks providing greater bearing areas without increasing the over-all width of the tractor and also making it possible to build larger and more powerful tractors that can still be easily transported on highways.

The purpose of this invention is to provide means for increasing the traction power of a tractor of the crawler type without increasing the over-all width of the tractor.

Tractors of the crawler type are particularly useful for working on soft muddy areas because of the wide bearing areas of the treads of the tracks, however, the width of the tracks is limited by the arrangement of the clutches and transmission elements which are located between the tracks. With this thought in mind this invention contemplates improved clutch and transmission mechanisms wherein the clutches drive back toward the center and around edges of the tracks to trains of gears which convey the driving power to the cog wheels of the tracks, thereby making it possible to increase the widths of the tracks without increasing the over-all width of the tractor.

The object of this invention is, therefore, to provide an improved steering clutch for a tractor which makes it possible to increase the widths of the crawler tracks so that larger and more powerful tractors which could easily be transported over highways because of the narrower over-all width may be built.

Another object of the invention is to provide steering and driving instrumentalities for a tractor of the crawler type which make it possible to increase the widths of the tracks and in which the parts are adapted to be actuated by conventional clutch pedals.

Another important object of the invention is to provide a friction clutch in which both the driving and driven elements extend from the same end of the clutch.

A further object of the invention is to provide a transmission assembly for a tractor of the crawler type in which power from the steering clutches is transmitted to the cog wheels of the tracks through trains of spur gears.

A still further object of the invention is to provide means for arranging the transmission elements of a tractor of the crawler type so that the width of the tracks may be increased in which the improved tractor is of a simple and economical construction.

With these and other objects and advantages in view the invention embodies a tractor having an engine housing mounted on endless tracks with a bevel pinion on the drive shaft meshing with a bevel gear on a clutch shaft and with friction steering clutches on opposite ends of the clutch shaft, controlled by clutch pedals, and actuating cog wheels of the tracks through trains of gears, and wherein the clutches drive the gears back through hubs rotatably mounted on the clutch shaft.

Other features and advantages of the invention will appear from the following description taken in connection with the drawings, wherein:

Figure 3 is a sectional plan taken substantially on line 3—3 of Figure 2 showing a detail of one of the clutches and also showing the train of gears for transmitting the power to the cog wheel of one of the tracks.

Figure 1:
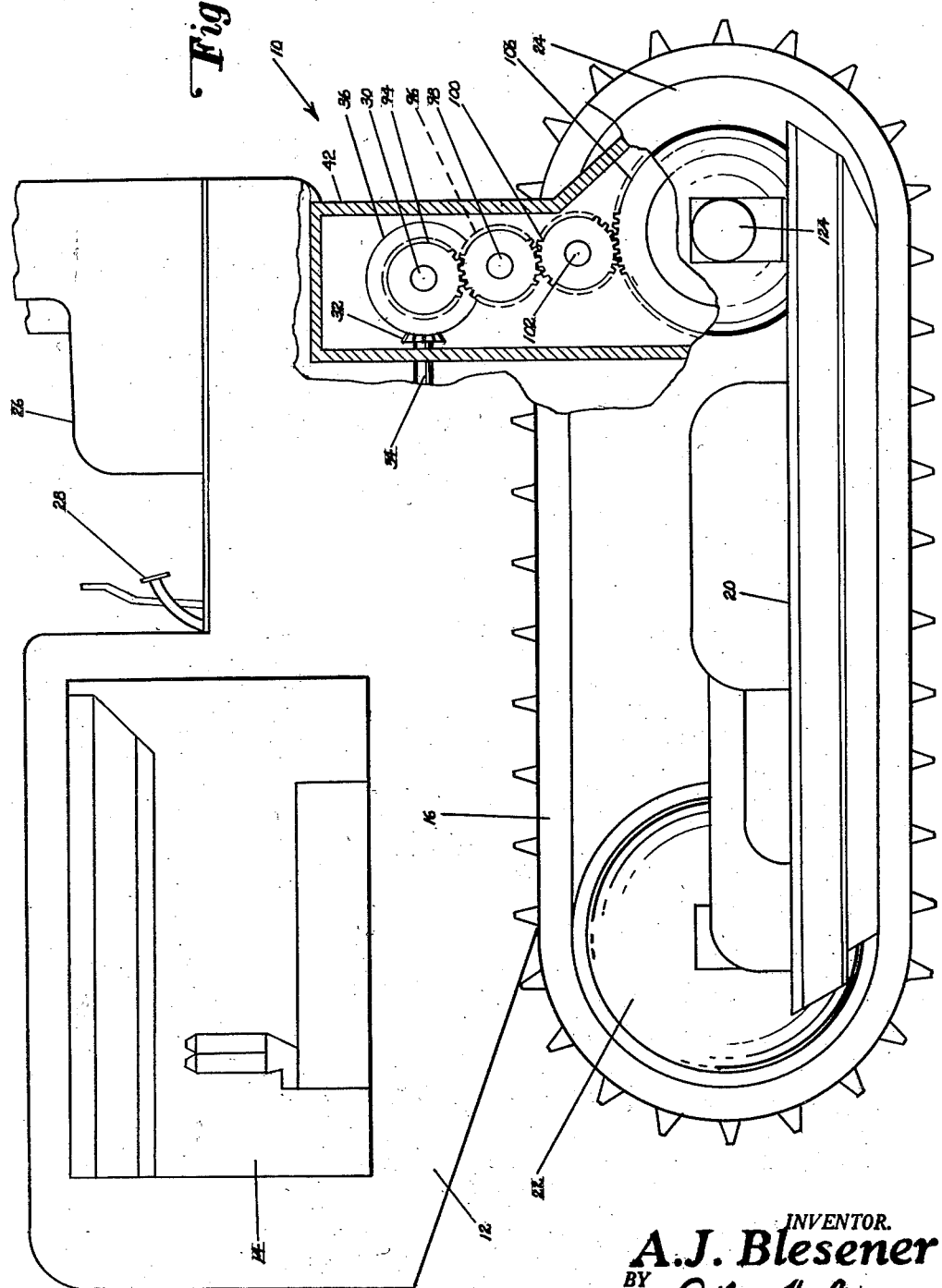
Figure 1 is a side elevational view of a tractor of the crawler type with part of the housing broken away showing a train of gears extended from the clutch shaft of the tractor to a gear on the cog wheel shaft of one of the tracks of the tractor.

While one embodiment of the invention is illustrated in the above referred to drawings, it is to be understood that they are merely for the purpose of illustration and that various changes in construction may be resorted to in the course of manufacture in order that the invention may be utilized to the best advantage according to circumstances which may arise, without in any manner departing from the spirit and intention of the device, which is to be limited only in accordance with the appended claims. And while there is stated the primary field of utility of the invention, it remains obvious that it may be employed in any other capacity wherein it may be found applicable.

In the accompanying drawings, and in the following specification, the same reference characters are used to designate the same parts and elements throughout, and in which the numeral 10 refers to the invention in its entirety, numeral 12 indicating the body or housing of a tractor, numeral 14 the engine thereof, numerals 16 and 18 endless tracks having conventional shoes or cleats, numeral 20 the track frames, numeral 22 the cog or sprocket wheels at the forward ends of the tracks, numerals 24 cog or sprocket wheels at the rear ends of the tracks, numeral 26 a tractor seat, and numeral 28 the clutch pedals of the tractor.

The improved clutches and gear trains of this invention are similar on both sides of the tractor and, consequently, the same reference characters are used for corresponding parts on each side.

The conventional elements of the tractor, such as the radiator, engine, clutches, speed change gears, and in fact everything except the final driving gears are positioned above the entire track mechanism. Placing these component parts entirely above the tracks and delivering the power to the tracks through the narrow space between the crawler treads is the only means whereby a machine of narrow overall width with wide track treads or shoes can be produced.

The clutch shaft 30, which drives both clutches, is driven by a bevel pinion 32 on the drive shaft 34 of the tractor transmission and engine, the pinion meshing with a bevel gear 36 which is mounted on the clutch shaft. The clutch shaft is rotatably mounted in partitions 38 and 40 of the housing 42, with bearings 44 and 46, and the intermediate part is supported through a hub 48, which is rotatable on the shaft, and which is rotatably mounted by a bearing 50 in a partition 52.

The shaft 30 is provided with a splined section 54 on which a hub 56 of an internal drum 58 is mounted, the internal drum providing a seat for a compression spring 60 which bears against an end plate 62 of a collar 64 which carries a shoe ring 66 that engages clutch plates 68 of an outer drum 70. The clutch plates 68 are keyed to the outer drum 70 and are free to slide longitudinally therein. These clutch plates are alternated with coacting clutch plates 72 keyed to a clutch drum 74, and the clutch plates 72 are free to slide longitudinally on the drum 74. The clutch drum 74 is mounted on the shaft 30 through an end plate 76 and a hub 78, and the clutch plates are gripped between the shoe ring 66 and an annular flange 80 of the clutch drum.

The outer drum 70 is secured by bolts 82 to a face plate 84 extended from the clutch hub 48, and a disc 86 secured between the drum and face plate is provided with a bearing 88 that is mounted on the clutch shaft 30. Conventional brake bands, as indicated by the numeral 90 are positioned around the outer drums 70 providing means for holding the tracks.

Upon operation of one of the clutch pedals 28 a clutch lever 92 on the hub 78 of the clutch drum 74 actuates the shoe ring 66 against the tension of the spring 60 to throw out or release the clutch.

With the clutch plates in engagement the parts rotate as a unit with the outer drum 70 rotating the hub 48 through the face plate 84 and a gear 94 on the inner end of the hub 48 actuates the train of gears whereby the rear cog wheels 24 are rotated and the track operated. The gear 94, which is carried by the driven clutch member, meshes with an idler gear 96 on a stub shaft 98 and the gear 96 meshes with a gear 100 on a counter-shaft 102. A gear 104 on the opposite end of the counter-shaft 102 meshes with a gear 106 on a sleeve 108 rotatably mounted on a head shaft 124, and the cog wheel 24 is carried on the opposite end of the sleeve.

Figure 2:
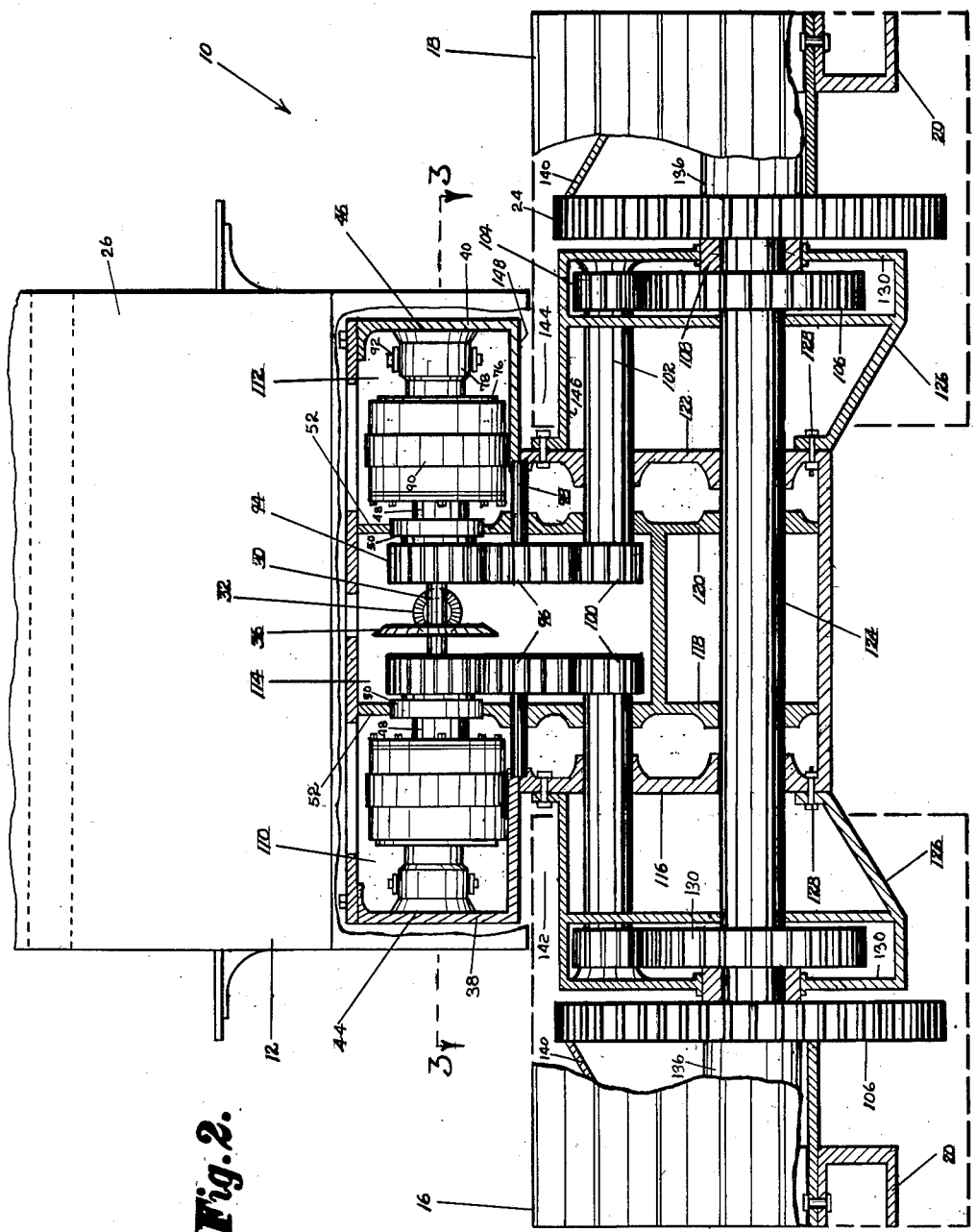
Figure 2 is a cross section through the clutch and gear housing on the rear portion of a tractor with parts of the tractor housing and tracks thereof shown in elevation and also with parts of the tracks shown in broken lines.

As illustrated in Figure 2 the housing 42 is substantially T-shaped in cross section having clutch compartments 110 and 112 with an intermediate compartment 114, and a stem or vertically disposed portion is provided with double walls 116 and 118 on one side and 120 and 122 on the other. The gear shafts 98 and 102 are rotatably mounted in bearings in the double walls, and the sleeves 108 which carry the rear cog wheels are rotatably mounted on a lower or head shaft 124 that is fixedly mounted in the double walls and that extends into the tracks. The lower portion of the housing is also provided with shields 126 that are bolted to the housing with bolts 128, and outer walls 130 of the shields provide bearings for the sleeves 108. The shields may also be provided with cover plates 132, as shown in Figure 3.

The cog or sprocket wheels 24 are mounted on the rear axle or shaft 124 with the sleeves 108 and the ends of the shaft are provided with bearings 134 which are mounted on the lower portions 20 of the track frames. As shown in Figure 3, the cog wheels are provided with hubs 136 and sleeves 138 are positioned on the ends of the shaft. The ends of the shaft are also enclosed with covers 140 to protect the cog wheels from gravel and the like.

With the conventional elements of the tractor, such as the radiator, engine, clutch, speed change gears, and other mounting elements positioned above the tracks and with the clutches driving back toward the center and through the trains of gears as disclosed and described and with first horizontal portions 146 of the housing extending over the pinions 104 and second horizontal portions 148 of the housing spaced above the first horizontal portions and with said first and second horizontal portions extending inwardly toward the longitudinal center of the housing openings 142 and 144 are provided in the sides of the housing and the upper sections of the crawler tracks extend into these openings, as shown in Figure 2. By this means a comparatively narrow space is provided between the inner edges of the tracks and, consequently, the widths of the tracks may be considerably increased so that it is possible to obtain more power in a crawler type tractor of this type without increasing the over-all width of the tractor.

It is, therefore, possible to build larger and more powerful tractors without increasing the width and such tractors could easily be transported over highways.

It will be understood that the steering clutches of the tractor of this invention may be replaced by clutches of different types, and other devices, such as planetary gear sets, torque converters, or electric motors may be used instead.

From the foregoing specification, it will become apparent that the invention disclosed will adequately accomplish the functions for which it has been designed and in an economical manner and that its simplicity, accuracy, and ease of operation are such as to provide a relatively inexpensive device, considering what it will accomplish, and that it will find an important place in the art to which the invention relates when once placed on the market.

It is thought that persons skilled in the art to which the invention appertains will be able to obtain a clear understanding of the invention after considering the description in connection with the drawings. Therefore, a more lengthy description is regarded as unnecessary.

Changes in shape, size, and rearrangement of details and parts, such as come within the purview of the invention claimed may be resorted to, in actual practice, if desired.

Having now described the invention that which is claimed to be new and desired to be procured by Letters Patent, is:

1. In a tractor driving unit, the combination which comprises a tractor having a housing, a power take-off, and spaced crawler tracks mounted on forward and rear cog wheels, a transversely disposed head shaft mounted in the tractor, sleeves rotatably mounted on the head shaft and on the outer ends of which the rear cog wheels are mounted, gears mounted on inner ends of the sleeves, counter-shafts rotatably mounted in the tractor and extended from the crawler tracks into the central portion of the tractor, pinions on both ends of the counter-shafts, the pinions on the outer ends of the counter-shafts meshing with the gears on the sleeves, the tractor housing including first horizontal portions extending over the last named pinions and inwardly toward the longitudinal center of the housing, idler gears rotatably mounted in the tractor and positioned to mesh with the pinions on the inner ends of the countershafts, a clutch shaft rotatably mounted in the tractor, means for driving the clutch shaft from the power take-off of the tractor, and gears mounted on the driven clutch members and positioned to mesh with said idler gears whereby with the gears positioned on opposite sides of the center and the inner edges of the crawler tracks spaced outwardly from the gears the crawler tracks are driven through a narrow space between inner edges of the tracks, said tractor housing further including second horizontal portions extending under the clutches and inwardly toward the longitudinal center of the housing, said first and second horizontal portions being spaced from one another vertically whereby to accommodate in each space an inwardly extended portion of track width relatively close to the longitudinal center of the tractor housing, whereby substantially wider crawler tracks are provided without a corresponding increase in the over-all width as measured between the outside edges of the tracks.

2. In a tractor driving unit, the combination which comprises a tractor housing, a transversely disposed head shaft positioned in one end of the tractor, sleeves rotatably mounted on ends of the head shaft, rear cog wheels positioned on outer ends of the sleeves, forward cog wheels rotatably mounted in the housing and aligned with the rear cog wheels, crawler tracks trained over the forward and rear cog wheels on each side of the housing, gears positioned on inner ends of the sleeves, counter-shafts rotatably mounted in the housing and extended from the crawler tracks into the central portion of the housing, pinions on both ends of the counter-shafts, the pinions on the outer ends of the counter-shafts meshing with the gears on the inner ends of the sleeves, the tractor housing including first horizontal portions extending over the last named pinions and inwardly toward the longitudinal center of the housing, idler gears rotatably mounted in the housing and positioned to mesh with the pinions on the inner ends of the counter-shafts, a clutch shaft rotatably mounted in the housing, bevel gears operatively connecting the clutch shaft to a driving shaft of the tractor, clutches mounted on ends of the clutch shaft, and gears mounted on the driven clutch members and positioned to mesh with the idler gears whereby driving elements of the crawler tracks are positioned adjacent the longitudinal center of the tractor and extend between inner edges of the tracks said tractor housing further including second horizontal portions extending under the clutches and inwardly toward the longitudinal center of the housing, said first and second horizontal portions being spaced from one another vertically whereby to accommodate in each space an inwardly extended portion of track width relatively close to the longitudinal center of the tractor housing, whereby substantially wider crawler tracks are provided without a corresponding increase in the overall width as measured between the outside edges of the tracks.

3. In a tractor, the combination which comprises a housing, an engine in the housing, transversely disposed forward and rear shafts mounted in the housing and spaced inwardly from the ends thereof, sleeves rotatably mounted on the rear shaft which provides a head shaft, sprocket wheels mounted on outer ends of said sleeves, endless crawler tracks trained over said sprocket wheels, gears on inner ends of the sleeves, counter-shafts rotatably mounted in the housing positioned above and parallel to the rear shaft, said counter-shafts extended inwardly toward the center of the housing, pinions on inner and outer ends of the counter-shafts, the pinions on the outer ends of the counter-shafts meshing with the gears of the sleeves, the tractor housing including first horizontal portions extending over the last named pinions and inwardly toward the longitudinal center of the housing, stub shafts positioned above and parallel to the counter-shafts, gears on the stub shafts meshing with the pinions on inner ends of the counter-shafts, a transversely disposed clutch shaft rotatably mounted in the housing, a gear on the clutch shaft, a drive shaft, a pinion on the drive shaft meshing with the gear on the clutch shaft, a clutch in the tractor housing and positioned on each end of the clutch shaft, gears on the driven clutch members meshing with the gears on the stub shafts, said tractor housing further including second horizontal portions extending under the clutches and inwardly toward the longitudinal center of the housing, said first and second horizontal portions being spaced from one another vertically whereby to accommodate in each space an inwardly extended portion of track width relatively close to the longitudinal center of the tractor housing, whereby substantially wider crawler tracks are provided without a corresponding increase in the over-all width as measured between the outside edges of the tracks.

References Cited in the file of this patent

UNITED STATES PATENTS

| | | |
|---|---|---|
| 1,184,705 | Norelius | May 23, 1916 |
| 1,446,121 | Johnston et al. | Feb. 20, 1923 |
| 1,855,209 | Turzicky | Apr. 26, 1932 |
| 2,034,125 | Wickersham | Mar. 17, 1936 |
| 2,076,009 | Starr et al. | Apr. 6, 1937 |
| 2,197,289 | Baker et al. | Apr. 16, 1940 |
| 2,325,396 | Hastings | July 27, 1943 |

FOREIGN PATENTS

| | | |
|---|---|---|
| 841,353 | France | Feb. 6, 1939 |